(12) United States Patent
Dahl

(10) Patent No.: US 7,647,923 B2
(45) Date of Patent: Jan. 19, 2010

(54) AUTOMATED BARBEQUE SAFETY MECHANISM

(76) Inventor: Randall C. Dahl, 5201 Amaro Way, Salida, CA (US) 95368

( * ) Notice: Subject to any disclaimer, the term of this patent is extended or adjusted under 35 U.S.C. 154(b) by 539 days.

(21) Appl. No.: 10/984,415

(22) Filed: Nov. 9, 2004

(65) Prior Publication Data

US 2006/0096585 A1  May 11, 2006

(51) Int. Cl.
  A47J 37/00 (2006.01)
  F24B 3/00 (2006.01)
(52) U.S. Cl. .............. 126/25 A; 126/25 AA; 126/25 R
(58) Field of Classification Search ........... 126/25 A, 126/25 AA, 20; 125/25 R; 219/401
  See application file for complete search history.

(56) References Cited

U.S. PATENT DOCUMENTS

| | | | |
|---|---|---|---|
| 2,582,720 A * | 1/1952 | Roberts ............... | 126/25 A |
| 2,747,567 A * | 5/1956 | Goodwin ............. | 126/25 A |
| 3,011,850 A * | 12/1961 | Davis ................ | 312/306 |
| 4,120,280 A | 10/1978 | Iverson et al. | |
| 4,535,749 A | 8/1985 | Schlosser et al. | |
| 4,932,390 A | 6/1990 | Ceravolo | |
| 5,042,451 A | 8/1991 | Beller | |
| 5,178,126 A | 1/1993 | Beller | |
| 5,363,752 A * | 11/1994 | Weil ................ | 99/445 |
| 5,628,242 A | 5/1997 | Higley | |
| 5,802,962 A | 9/1998 | Goldyn | |
| 5,938,959 A * | 8/1999 | Wang ............... | 219/401 |
| 5,944,008 A | 8/1999 | Winkel | |
| 6,029,646 A | 2/2000 | Jackson | |
| 6,041,768 A | 3/2000 | Giammona et al. | |
| 6,386,192 B1 | 5/2002 | Weber | |
| 6,481,341 B1 | 11/2002 | Choi | |
| 6,591,740 B1 | 7/2003 | Hsu | |
| 6,609,512 B2 * | 8/2003 | Poe et al. ............ | 126/25 A |
| 6,684,757 B2 | 2/2004 | Petersen | |
| 6,694,965 B1 | 2/2004 | Chen | |
| 6,733,276 B1 | 5/2004 | Kopping | |

* cited by examiner

Primary Examiner—Kenneth B Rinehart
Assistant Examiner—Chuka C Ndubizu
(74) Attorney, Agent, or Firm—Marc E. Hankin; Kevin E. Schraven; Hankin Patent Law, APC

(57) ABSTRACT

This invention is a safety mechanism that improves upon existing inventions in the field of barbeques and grills by minimizing grill fires and/or burning or overcooking of one's food. A barbeque includes a control panel that receives input from one or several thermocouples installed inside the grill. In the event of a grill fire, the thermocouples detect the high heat, send a signal to the control panel, that in turn activates a mechanical lift to move the barbecue's cooking-grid away from the flame.

1 Claim, 8 Drawing Sheets

AUTOMATED BARBEQUE SAFETY MECHANISM

FIELD OF INVENTION

This invention relates, generally, to barbeques; more particularly to barbeques designed to minimize grill fires, burning, and/or overcooking of food through automated electromechanical means.

BACKGROUND

The practice of barbecuing or grilling provides a uniquely delicious and enjoyable means of preparing food. Among other things, it allows food to be prepared over an open fire, creating a distinct, savory flavor. Moreover, because it can be practiced outdoors and in remote locations away from conventional kitchens, it allows the chef to prepare the food while participating in other social and/or festive activities.

Some dangers and inconveniences of grilling arise because of the risk of fire and/or burning or overcooking of one's food. For instance, several commonly grilled foods, such as fish and chicken contain oils and fatty substances that, when exposed to the open flame, can fuel a dangerous fire and/or result in the burning or overcooking of one's food. To avoid these common problems, the chef is required to closely supervise the food's preparation, monitor the flame size, and otherwise ensure that the food is not too close to the flame. If the chef becomes preoccupied, otherwise neglects the grill, or is merely inexperienced, his or her neglect can easily lead to a dangerous fire and/or accidentally burn the meal.

Several mechanisms have been developed to allow the chef to more easily carry out this function. U.S. Pat. No. 4,120,280 to Iverson et al., U.S. Pat. No. 4,932,390 to Ceravolo, U.S. Pat. No. 6,609,512 to Poe, Jr. et al., U.S. Pat. No. 6,591,740 to Hsu, and U.S. Pat. No. 5,944,008 to Winkel all disclose means of varying the distance between the flame and food through manual, mechanical means. Each of them, however, still requires the chef's constant supervision of the food's preparation as well as the chef's manual adjusting of the height of the cooking-grid or the flame. Other grills utilize a cover that keeps air from entering the grill and, thus, stifling the flame by starving it of oxygen, such as U.S. Pat. No. 5,535,749 to Schlosser et al. This mechanism, however, can only be used with charcoal-fueled grills and is imperfect because, although it can oftentimes prevent a dangerous fire, it will nevertheless sometimes allow food to become overcooked or burned.

Other grills utilize an adjustable gas valve that allows the chef to adjust flame size and intensity in order to regulate the temperature of the food and minimize fires and/or overcooking. Such mechanisms, however, still require the chef's constant supervision and cannot be used with grills that are fueled by charcoal rather than gas. Improvements on such gas mechanisms are disclosed in U.S. Pat. No. 6,041,768 to Giammona et al., U.S. Pat. No. 5,628,242 to Higley, U.S. Pat. No. 6,684,757 to Petersen, and U.S. Pat. No. 6,733,276 to Kopping. Each of these patents discloses varying timing mechanisms that serve to automatically cut off gas supply to the grill at the expiration of a predetermined time period, thereby preventing a fire and/or overcooking of the food. These mechanisms, however, also suffer from several shortcomings. First, they can only be used with gas-fueled grills and cannot be used with charcoal-fueled grills, which many chefs prefer. Moreover, they do not provide a reliable means of minimizing fires because they operate based on a timer and grill fires are unpredictable and can ignite at any time. Finally, such timers will shut off the flame completely in order to prevent a fire and, in so doing, halt the cooking process altogether.

Therefore, there is a long-felt need in the art for a grilling mechanism that will automatically minimize fires and/or burning or overcooking of one's food, is compatible with both gas-fueled and charcoal-fueled grills, is sensitive to the constant changes in grill temperature, and will minimize a dangerous grill fire while still keeping food warm.

SUMMARY OF THE INVENTION

This invention is directed towards overcoming the above problems through an automated barbeque safety mechanism that monitors the temperature of the barbeque and automatically adjusts distance between the cooking-grid and the flame in order to minimize a grill fire and/or burning or overcooking of one's food. This invention is compatible with grills fueled by gas, coal, charcoal, synthetic briquette, wood, wood chip, or by other combustible materials suitable for cooking food.

The automated barbeque safety mechanism operates via one or several thermocouples inside the grill. The thermocouple(s) produce an electronic output signal that is delivered to a control mechanism. This control mechanism processes the signal from the thermocouple(s) and automatically controls a mechanical apparatus, which is used to adjust the distance between the cooking-grid and the barbeque casting.

The control mechanism receives an input signal from the thermocouple(s) indicating the temperature of the grill and sends an output signal to a mechanical apparatus that adjusts the distance between the flame and the cooking-grid according to a preset program. One such program, for example to minimize grill fires, would be to completely separate the barbeque casting from the cooking-grid when the thermocouple(s) detect an extremely high temperature in the grill. Another such program would be to constantly adjust the distance between the fire and the cooking-grid to match the temperature setting selected by the chef.

Many mechanical apparatuses are known in the arts that can carry out this function, including but not limited to scissor lifts, hydraulic cylinder, roller screws, gear boxes, motor driven pulleys, and air cylinders.

Additionally, the mechanical apparatus can be used manually via a switch that allows the chef to adjust the distance between the cooking-grid and the flame by controlling the electric signal that is sent to the mechanical apparatus.

Other features and advantages of this invention will become apparent from the following description of several embodiments of the invention, taken in conjunction with the accompanying drawings, which illustrate, by way of example, the principles of the invention.

DETAILED DESCRIPTION

In the following detailed description of various embodiments of the invention, numerous specific details are set forth in order to provide a thorough understanding of various aspects of one or more embodiments of the invention, however, one or more embodiments of the invention may be practiced without these specific details. In other instances, well-known methods, procedures, and/or components have not been described in detail so as not to unnecessarily obscure aspects of embodiments of the invention.

In the following description, certain terminology is used to describe certain features of one or more embodiments of the invention. For instance "barbeque" and "grill" refer to any of the numerous gas, coal, charcoal, synthetic briquette, wood, wood chip, or apparatuses fueled by other combustible materials that may be used for cooking food.

Figure 1:
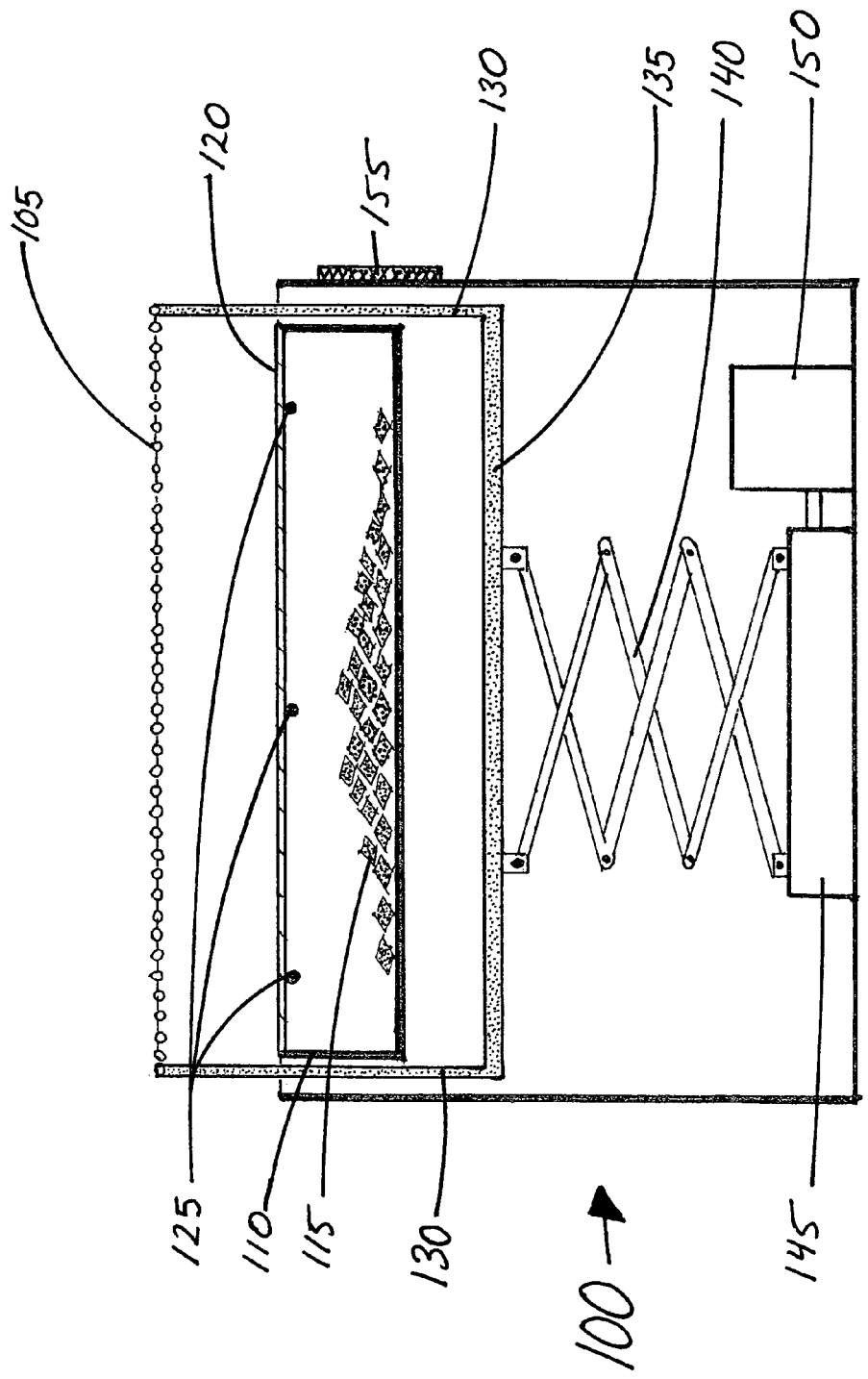
FIG. 1 is an illustration in cross sectional view of one embodiment of the present invention while the cooking-grid is in an elevated position.

FIG. 1 is an illustration in cross sectional view of one embodiment of the present invention while the cooking-grid is in an elevated position. A barbeque 100 is shown with its cooking-grid 105 in an elevated position. Beneath the cooking grid 105 is a fixed barbeque casting 110 with charcoals 115 stacked inside. This configuration can also be used with gas-fueled barbeques, although those are not illustrated. Above the coals is an intermediate grill surface 120 that holds one or several thermocouples 125. The cooking-grid 105 is supported by two support arms 130 that are connected to one another by a cross beam 135. The cross beam is raised and lowered via a lift 140 that is operated by a gear box 145. The lift 140 can be a scissor lift, as shown, or a hydraulic cylinder, roller screw, gear box, motor driven pulley, air cylinder, or one of several other mechanical lifting mechanisms known in the art. A motor and battery unit 150 powers the gear box 145 and is, in turn, controlled by a control panel 155, which processes an input signal from the thermocouples 125 and is operated by the chef. The apparatus could operate wirelessly by remote control, bluetooth connectivity, or with more conventional electrical wires, but no particular structure is illustrated for any of these mechanisms.

Figure 2:
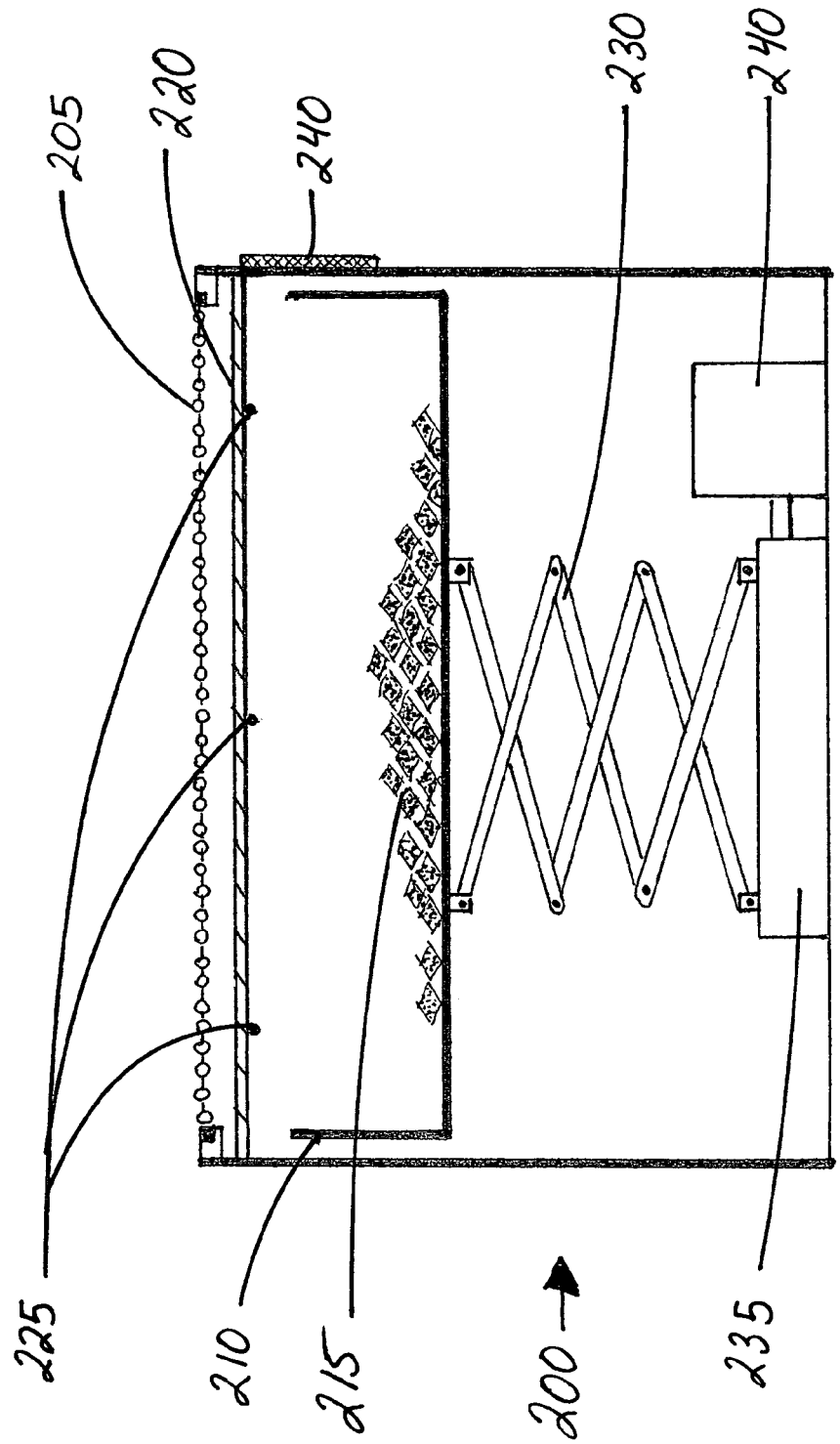
FIG. 2 is an illustration in cross sectional view of one embodiment of the present invention while the barbeque casting is in a lowered position, away from the cooking-grid.

FIG. 2 is an illustration in cross sectional view of one embodiment of the present invention while the barbeque casting is in a lowered position, away from the cooking-grid. A barbeque 200 is shown with a fixed cooking grid 205. Beneath the cooking grid 205 is an intermediate grill surface 220 that holds one or several thermocouples 225. Beneath the intermediate grill surface 220 is a moveable barbeque casting 210 with charcoals 215 stacked inside. This configuration can also be used with gas-fueled barbeques, although those are not illustrated. The barbeque casting 210 is raised and lowered via a lift 230 that is operated by a gear box 235. The lift 230 can be a scissor lift, as shown, or a hydraulic cylinder, roller screw, gear box, motor driven pulley, air cylinder, or one of several other mechanical lifting mechanisms known in the art. A motor and battery unit 240 powers the gear box 235 and is, in turn, controlled by a control panel 245, which processes an input signal from the thermocouples 225 and is operated by the chef. The apparatus could operate wirelessly by remote control, bluetooth connectivity, or with more conventional electrical wires, but no particular structure is illustrated for any of these mechanisms.

Figure 3:
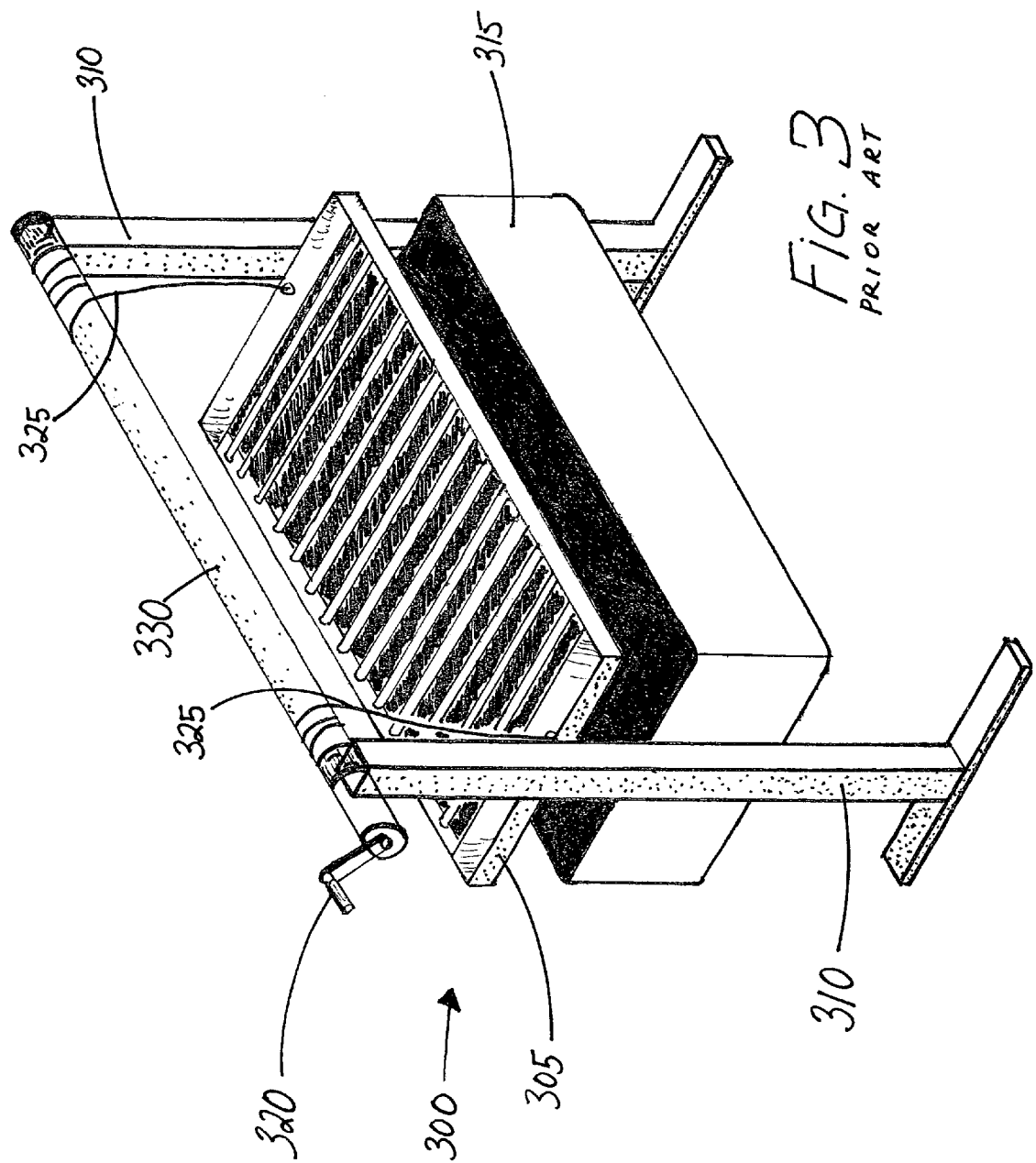
FIG. 3 is an illustration in perspective view of a prior art conventional grill that uses manual means for elevating and lowering the cooking-grid.

FIG. 3 is an illustration in perspective view of a prior art conventional grill that uses one known type of non-automatic manual means for elevating and lowering the cooking-grid. A barbeque 300 is shown with a moveable cooking-grid 305 that is supported over a fixed barbeque casting 315 by two support columns 310. The cooking-grid may be manually raised and lowered by the chef via a ratchet arm 320 that pulls and releases cables 325 that are connected to a cross beam 330. The process is not automated.

Figure 4:
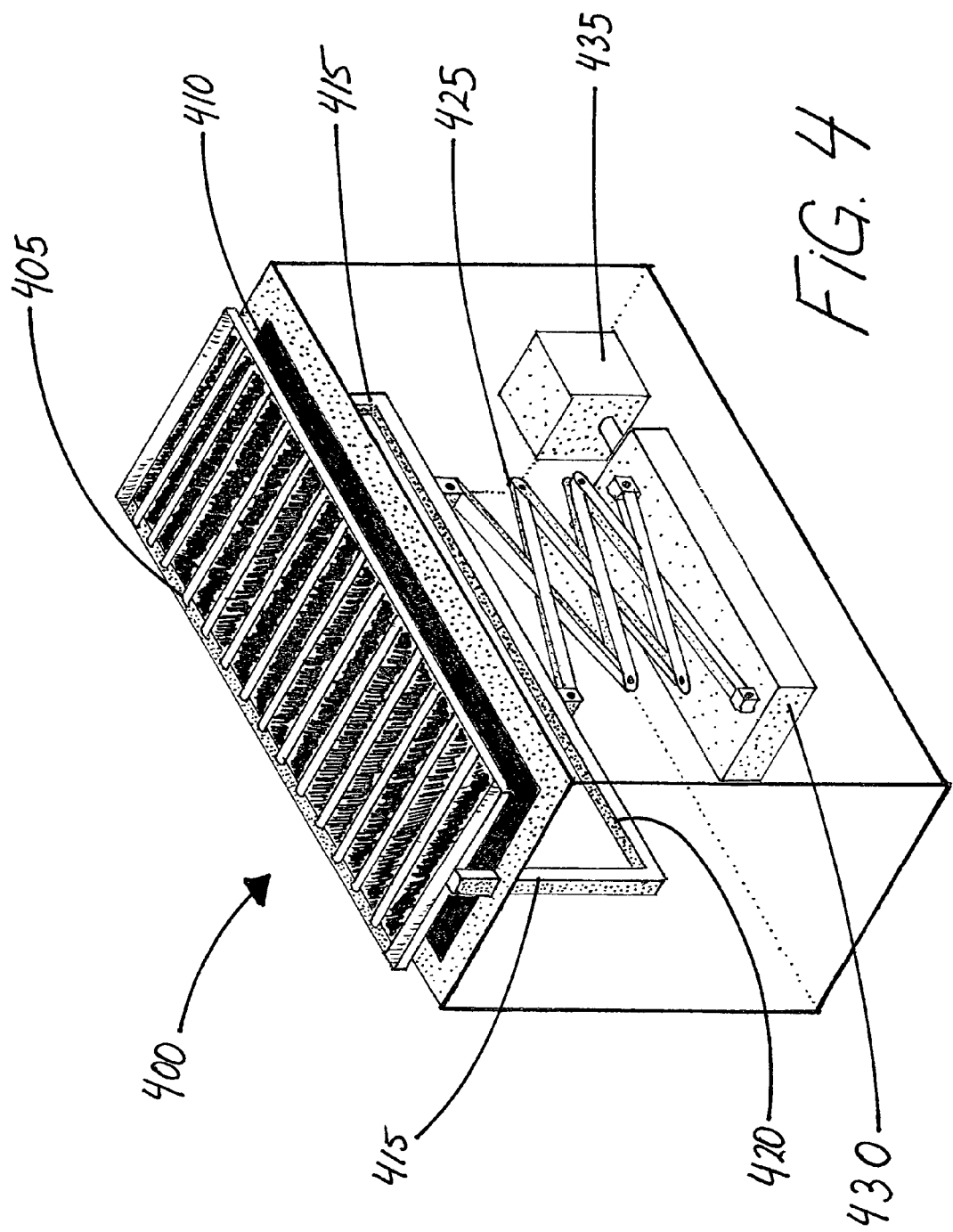
FIG. 4 is an illustration in perspective view of one embodiment of the present invention.

FIG. 4 is an illustration in perspective view of one embodiment of the present invention. A barbeque 400 is shown with its cooking-grid 405 in an elevated position. Beneath the cooking grid 405 is a fixed barbeque casting 410 that can utilize means for heating food including but not limited to charcoal, or gas. The cooking-grid 405 is supported by two support arms 415 that are connected to one another by a cross beam 420. The cross beam is raised and lowered via a lift 425 that is operated by a gear box 430. The lift 425 can be a scissor lift, as shown, a hydraulic cylinder, roller screw, gear box, motor driven pulley, air cylinder, or one of several other mechanical lifting mechanisms known in the art. A motor and battery unit 435 powers the gear box 430.

Figure 5:
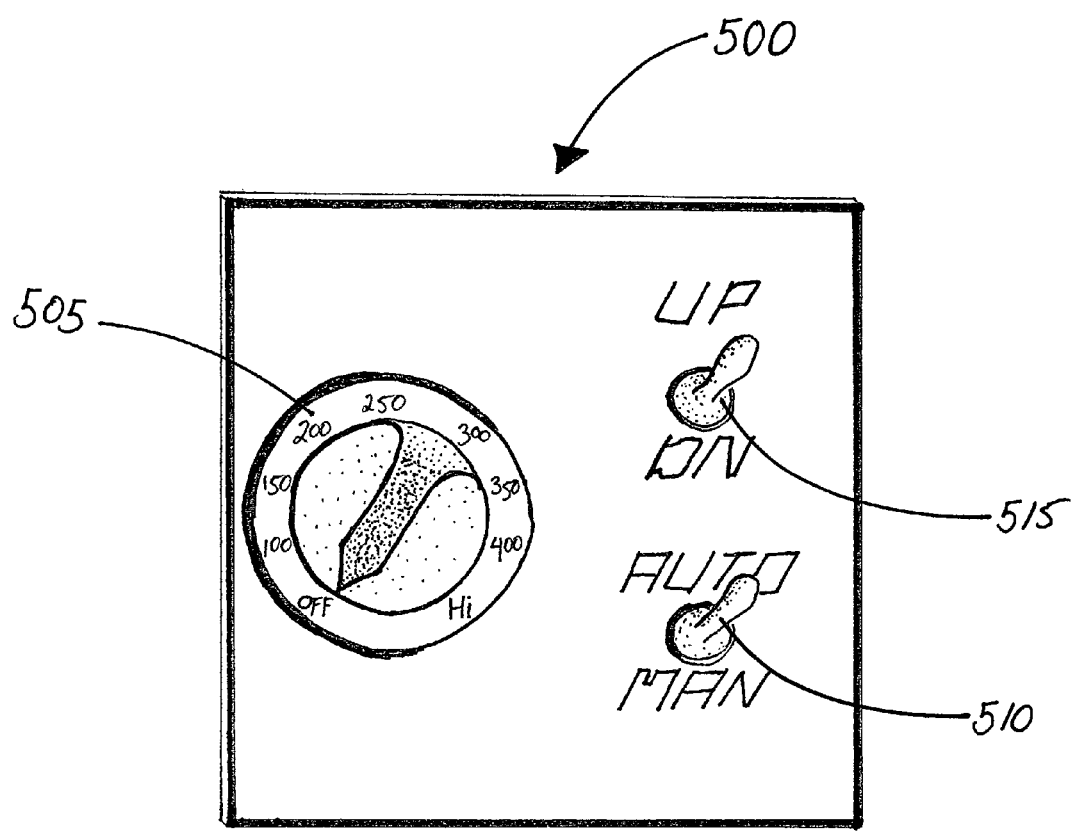
FIG. 5 is an illustration in perspective view of the control panel of one embodiment of the present invention.

FIG. 5 is an illustration in frontal view of the control panel of one embodiment of the present invention. A barbecue's control panel 500 is shown with a control for the barbecue's temperature setting 505, switch 510 for selecting between automatic and manual modes, and a switch 515 for raising and lowering the cooking-grid while the barbeque is in manual mode.

Figure 6:
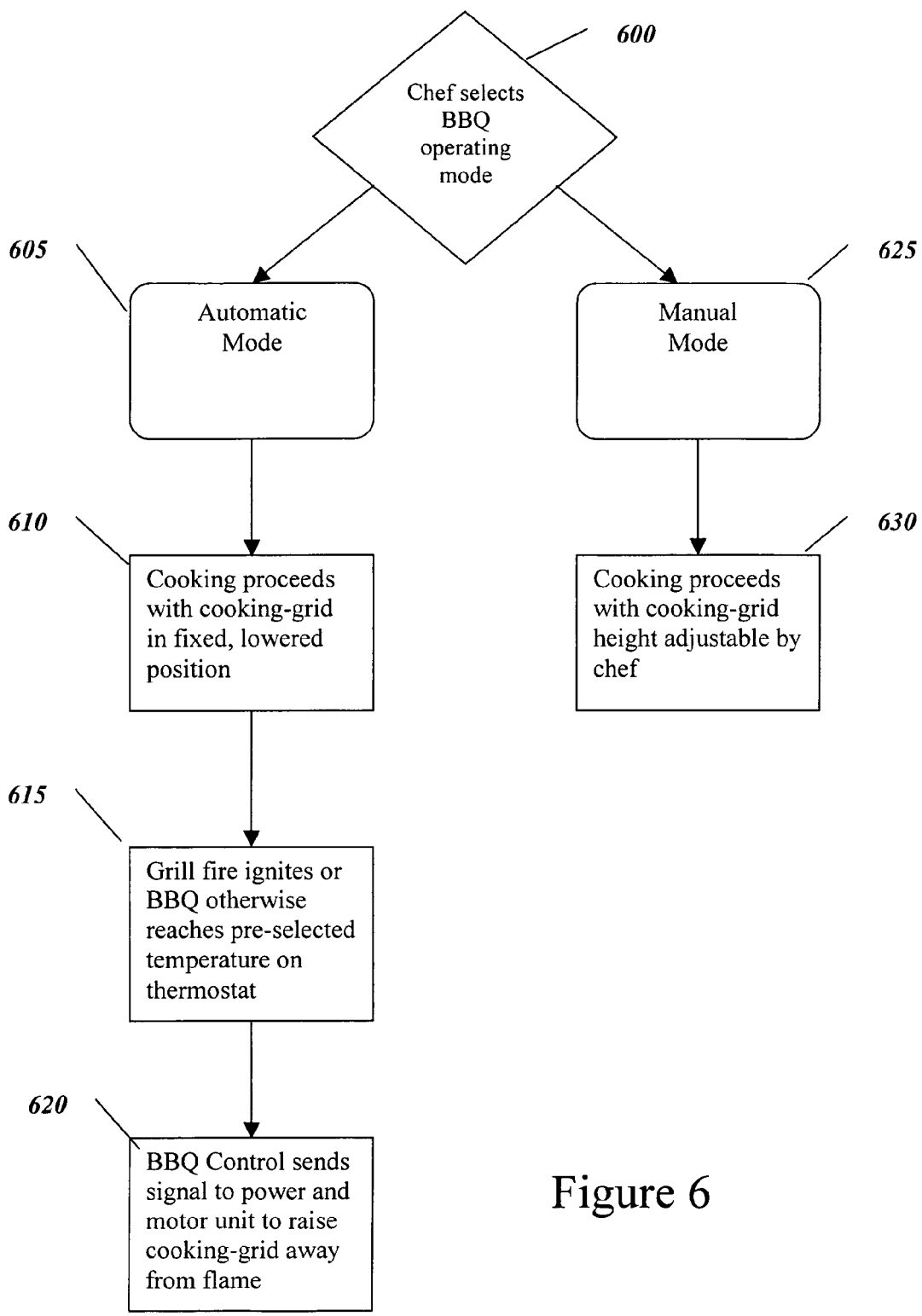
FIG. 6 is a flow chart that illustrates the program for one embodiment of the present invention.

FIG. 6 is a flow chart that illustrates the procedure for using the automated barbeque safety mechanism in one embodiment of the present invention. FIG. 6 diagrams the chef's decision to operate the barbeque in automatic mode by adjusting a switch on the barbecue's control panel 600. If the chef decides to operate the barbeque in automatic mode, this activates the barbeque's automatic controls 605. With the barbeque operating in automatic mode, the cooking-grid begins in a fixed, lowered position 610. Cooking will proceed with the cooking-grid in this position unless and until the thermocouple(s) detect a change in temperature indicative of a grill fire or the barbeque otherwise reaches a pre-selected temperature 615. If this occurs, the control panel sends a signal to the power and motor unit to raise the cooking-grid away from the flame 620. On the other hand, the chef can decide to operate the barbeque in manual mode 625. In this case, the cooking continues with the cooking height adjustable by the chef, but the automatic controls are not activated 630.

Figure 7:
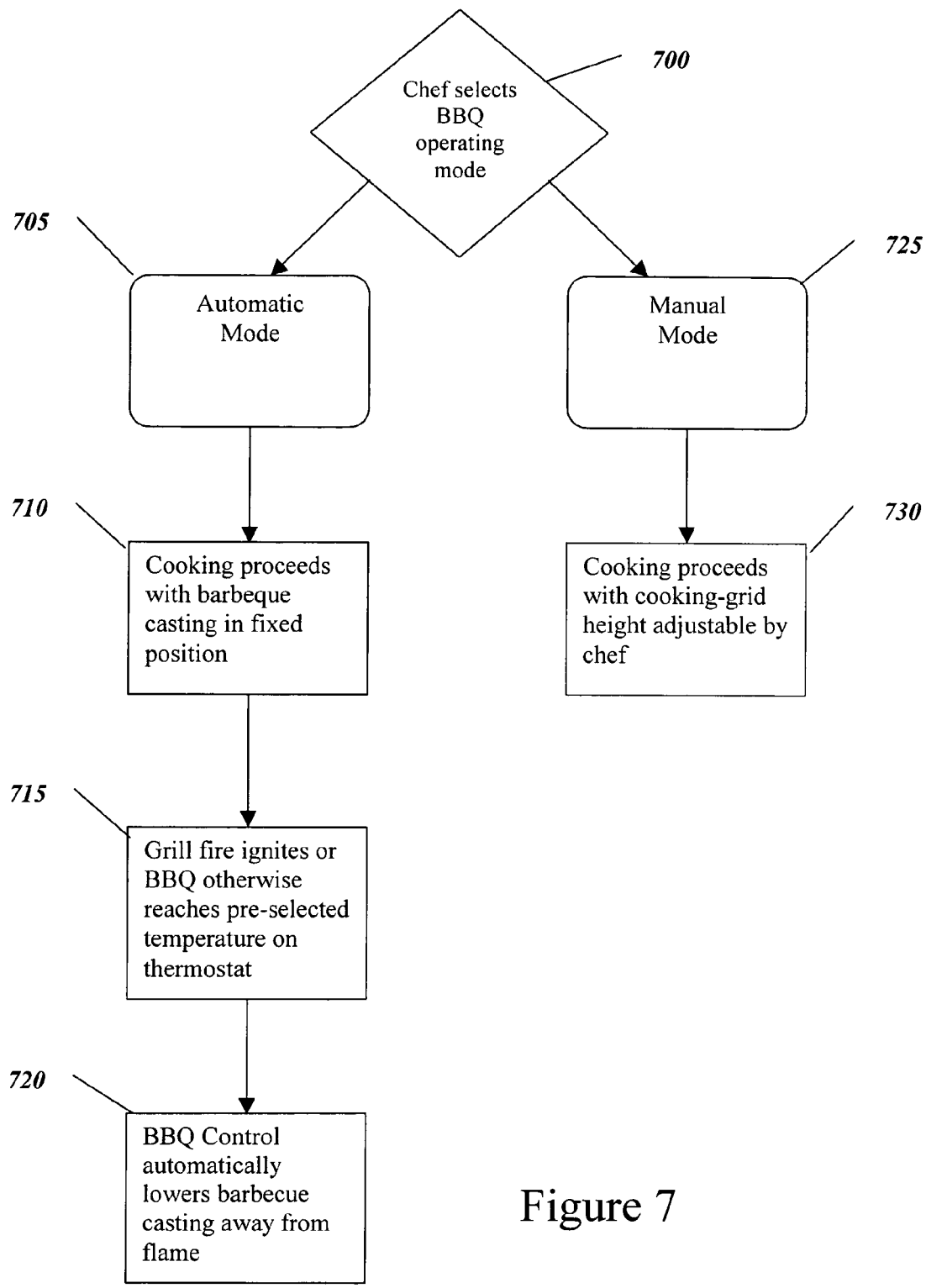
FIG. 7 is a flow chart that illustrates the program for another embodiment of the present invention.

FIG. 7 is a flow chart that illustrates the procedures for using the automated barbeque safety mechanism in one embodiment of the present invention. FIG. 7 diagrams the chefs decision to operate the barbeque in automatic mode by adjusting a switch on the barbecue's control panel 700. If the chef decides to operate the barbeque in automatic mode, this activates the barbeque's automatic controls 705. With the barbeque operating in automatic mode, the barbeque casting begins in a fixed, heightened position 710. Cooking will proceed with the barbeque casting in this position unless and until the thermocouple(s) detect a change in temperature indicative of a grill fire or the barbeque otherwise reaches a pre-selected temperature 715. If this occurs, the control panel sends a signal to the power and motor unit to lower the barbeque casting away from the flame 720. On the other hand, the chef can decide to operate the barbeque in manual mode 725. In this case, the cooking continues with the cooking height adjustable by the chef, but the automatic controls are not activated 730.

Figure 8:
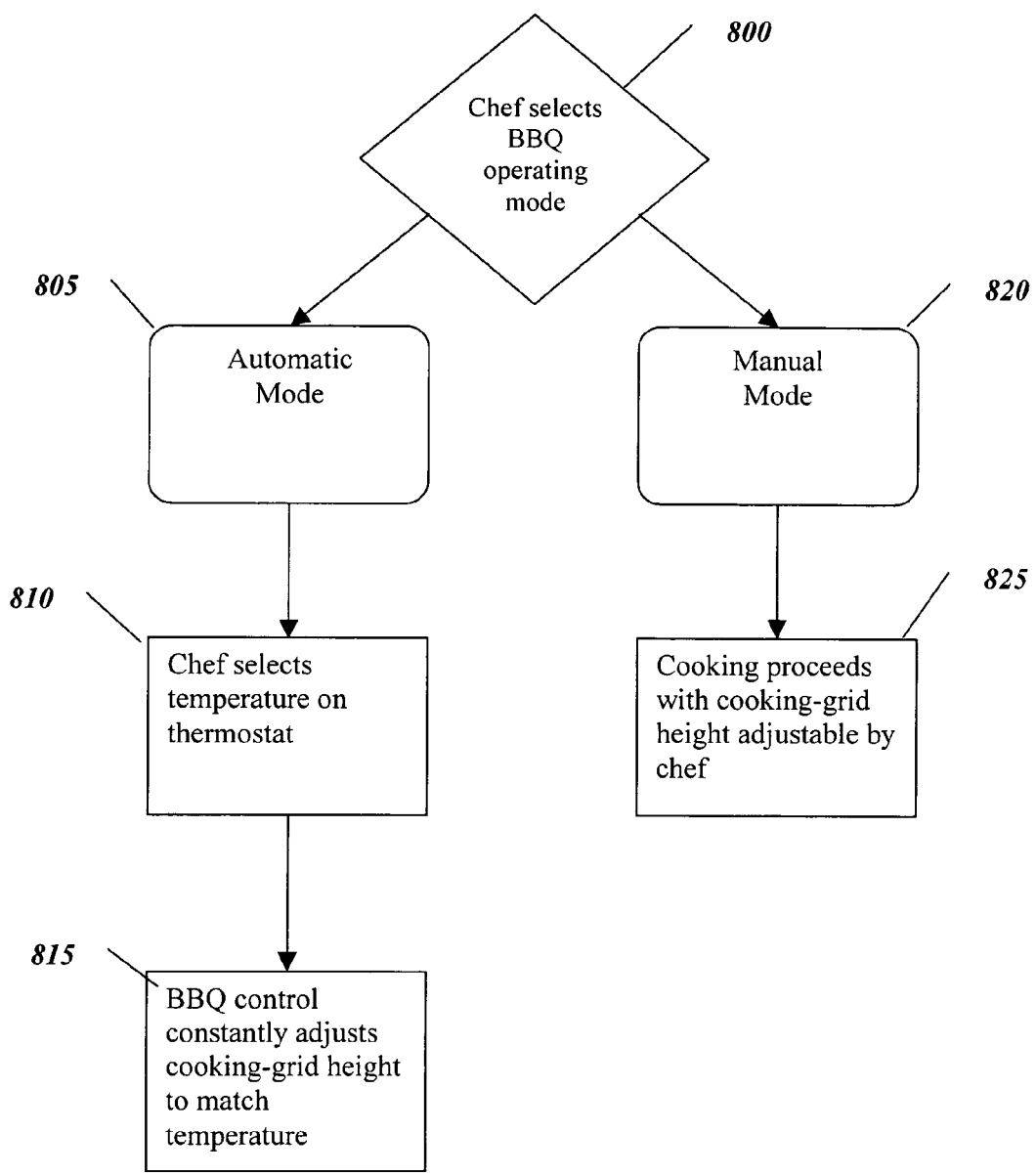
FIG. 8 is a flow chart that illustrates the program for another embodiment of the present invention.

FIG. 8 is a flow chart that illustrates the procedure for using the automated barbeque safety mechanism in another embodiment of the present invention. The chef can choose to operate the barbeque in automatic mode or in manual mode 800 by adjusting a switch on the barbecue's control panel. If the chef decides to operate the barbeque in automatic mode, the barbeque's automatic controls are activated 805. In automatic mode, the chef selects the cooking temperature on the control panel's thermostat 810. While in automatic mode, the barbeque constantly adjusts the cooking grid height according to input received from the thermocouple(s) to match the temperature selected by the chef on the thermostat 815. Alternatively, the chef can decide to operate the barbeque in manual mode 820. In manual mode, cooking continues with the cooking height adjustable by the chef, but the automatic controls are not activated 825.

I claim:

1. A cooking apparatus, comprising,
   a barbeque, said barbeque being comprised of a cooking-grid and a barbeque casting;
   said cooking-grid being configured to hold food over the barbeque casting and to allow heating of the food;
   said barbeque casting being configured below the cooking-grid and facilitating heating of the food by emitting thermal energy;
   said cooking-grid being movable such that the distance between the cooking-grid and the barbeque casting can be varied;
   a temperature measuring device that emits an output signal;
   a control device for processing the signal received from the temperature measuring device; and
   a mechanical means for varying the distance between the cooking-grid and the barbeque casting according to said output signal received from said control device, wherein:
   said temperature measuring device is one or more thermocouples:
   said one or more thermocouples are fixed onto an intermediate grill surface of said barbeque casting;
   said barbeque casting is fixed relative to the ground and the height of the cooking-grid can be varied; and
   in response to a signal from said temperature measuring device indicating high heat, the cooking-grid is automatically raised to a maximum height, thereby maximizing the distance between the cooking-grid and the barbeque casting;
   wherein one or more additional switches allow the chef to manually control the distance between the cooking-grid and the barbeque casting, allow the chef to select a temperature, and allow the chef to select between an automatic mode and a manual mode.

\* \* \* \* \*

UNITED STATES PATENT AND TRADEMARK OFFICE
CERTIFICATE OF CORRECTION

| | |
|---|---|
| PATENT NO. | : 7,647,923 B2 |
| APPLICATION NO. | : 10/984415 |
| DATED | : January 19, 2010 |
| INVENTOR(S) | : Randall C. Dahl |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this

Sixteenth Day of November, 2010

David J. Kappos
*Director of the United States Patent and Trademark Office*